United States Patent [19]

Morgan et al.

[11] Patent Number: 5,795,605
[45] Date of Patent: Aug. 18, 1998

[54] PROCESS FOR PRODUCING A LINKED, CO-EXTRUDED EDIBLE PRODUCT

[75] Inventors: Trevor Francis Morgan, Airdrie, United Kingdom; Gordon Frame, Neshanic, N.J.; Petrus Johannes Kobussen, La Veghel, Netherlands

[73] Assignee: Devro PLC, Glasgow, Great Britain

[21] Appl. No.: 673,411

[22] Filed: Jun. 28, 1996

Related U.S. Application Data

[63] Continuation of Ser. No. 256,390, filed as PCT/GB92/02381, Dec. 23, 1992 published as WO93/12660, Jul. 8, 1993, abandoned.

[30] Foreign Application Priority Data

Dec. 28, 1991 [GB] United Kingdom .................. 9127463

[51] Int. Cl.$^6$ .................. A22C 11/00; A23L 1/317
[52] U.S. Cl. .................. 426/277; 426/278; 426/513; 426/516
[58] Field of Search .................. 426/92, 250, 276, 426/277, 278, 281, 302, 305, 513, 105, 140, 516

[56] References Cited

U.S. PATENT DOCUMENTS

| | | |
|---|---|---|
| 2,988,451 | 6/1961 | Zahn . |
| 3,041,182 | 6/1962 | Hansen et al. .................. 426/92 |
| 3,073,702 | 1/1963 | Keil et al. .................. 426/92 |
| 3,535,125 | 10/1970 | Fagan . |
| 3,622,353 | 11/1971 | Bradshaw et al. . |
| 3,882,252 | 5/1975 | Winkler . |
| 3,894,158 | 7/1975 | Miller . |
| 4,061,786 | 12/1977 | Winkler et al. .................. 426/277 X |
| 4,407,829 | 10/1983 | Sjolander .................. 426/92 X |
| 4,476,072 | 10/1984 | Ariëns . |
| 5,271,948 | 12/1993 | Boni et al. .................. 426/278 |

FOREIGN PATENT DOCUMENTS

| | | |
|---|---|---|
| 56402/69 | 6/1969 | Australia . |
| 10286/76 | 1/1976 | Australia . |
| 91785/82 | 12/1982 | Australia . |
| 1583367 | 10/1969 | France . |
| 63-258561 | 10/1988 | Japan .................. 426/646 |
| 405517 | 7/1971 | U.S.S.R. . |
| 462577 | 12/1972 | U.S.S.R. . |
| 1 232 801 | 5/1971 | United Kingdom . |
| 1 288 111 | 6/1972 | United Kingdom . |
| 1432271 | 4/1976 | United Kingdom . |

*Primary Examiner*—Arthur L. Corbin
*Attorney, Agent, or Firm*—Pennie & Edmonds, LLP

[57] ABSTRACT

Sausages are produced by co-extruding a uniform layer of acid collagen gel around an extruded edible meat product, and chemically coagulating the co-extruded gel in a bath containing a chemical coagulating agent, such as to provide a collagen casing of sufficient mechanical strength to allow mechanical formation of sausage links by twist-linking or crimping. Preferably a coagulating agent such as liquid smoke is included in the collagen gel prior to extrusion. The coagulating bath may comprise a dehydrating agent such as alkali or a salt solution. No expensive air drying step is required in order to produce continuous casings of good strength.

12 Claims, 1 Drawing Sheet

PROCESS FOR PRODUCING A LINKED, CO-EXTRUDED EDIBLE PRODUCT

This is a continuation of application Ser. No. 08/256,390, filed Oct. 11, 1994, now abandoned, which is a national stage filing of PCT/GB 92/02381, filed Dec. 23, 1992, published as WO93/12660, Jul. 8, 1993.

TECHNICAL FIELD

The invention relates to a process and apparatus for the production of co-extruded collagen coated foodstuffs such as sausages.

While the process relates particularly to the production of sausages, it may also be used in the production of other collagen coated foodstuffs such as fish or meat products or products containing vegetable or cheese or both. Thus, while the description of the process will be in terms of the production of strings of sausages, the process is clearly not limited to that particular foodstuff.

BACKGROUND ART

There are known processes of co-extruding sausages or sausage-like materials. One particular process is disclosed in patent specification GB1232801. Essentially, the process involves extruding a cylindrical core of sausage meat mix and simultaneously extruding around the sausage meat an outer casing of a collagen gel. The collagen gel has a high water content and the gel is coagulated by removal of some of the water by osmosis by passage through a concentrated sodium chloride bath. However, coagulation of the collagen casing is not complete at this stage so that the casing is relatively weak in terms of mechanical properties. In particular, there would not generally be sufficient strength to enable crimping or twist linking to take place. In the conventional process, the co-extruded sausage is then cut into individual sausages which are transported to a hot air drying cabinet where the hardening of the casing is completed and at the same time some partial cooking of the sausage meat occurs.

This process is thus not suitable for the production of twist link sausages. At the end of the brine bath, the collagen casing has insufficient strength to allow twist linking to be successfully carried out. On the other hand, after completion of hardening of the casing, partial cooking of the sausage meat has occurred. A partially cooked sausage is unsuitable for twist linking, due to solidification of the sausage meat.

A further disadvantage of the conventional process is that the air drying stage is costly in terms of energy consumption.

Japanese patent application 63-219473 (publication H2-69139) suggests the addition of a liquid smoke solution into the collagen gel immediately prior to co-extrusion in order to overcome problems of splitting of the sausage casing during the air drying stage.

It is an object of the present invention to mitigate these problems and provide a process which avoids the costly air drying stage, and also allows the production of twist linked strings of sausages.

SUMMARY OF THE INVENTION

The present invention relates to a process of producing co-extruded sausage which comprises:
 co-extruding a substantially uniform layer of collagen gel around an extruded edible product; and
 chemically coagulating the co-extruded collagen gel using a chemical coagulating agent in the absence of heated air drying or forced air drying, such as to provide around the edible product a coagulated collagen casing of sufficient strength to allow mechanical separation into sausage links.

The invention also provides a corresponding apparatus for carrying out the process; and to the product itself.

DETAILED DESCRIPTION OF THE INVENTION

Figure 1:
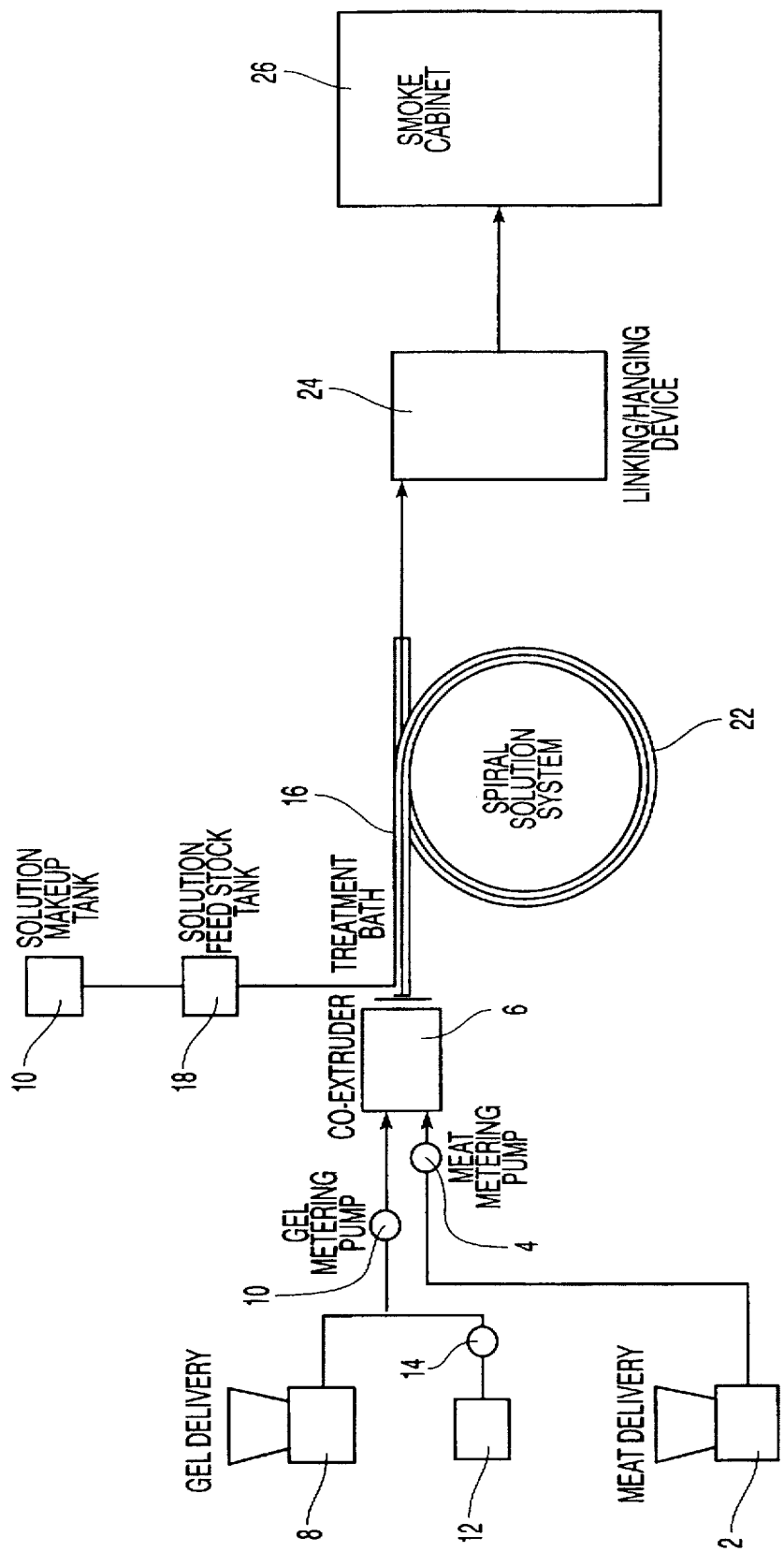

The term "coagulating" is a term of art in the production of collagen coated sausage material and is not strictly scientific in the sense in which it is used. Coagulating as used in this specification reform to the step involving hardening and stabilisation of the casing. This is principally achieved in two ways; firstly by removal of water from the collagen gel, and secondly by cross-linking the collagen. Either or both of these methods may be employed as appropriate.

Thus, it is known that collagen is a protein able to form aqueous gels of high water content. Typically, maximum gel water uptakes can be achieved at a pH of around 2 and a pH of around 13 which correspond roughly to the points of maximum swelling of the collagen protein. Higher water uptakes are generally found in the acid region and for this reason acid collagen gels are often used for extrusion purposes. Thus, coagulation of the collagen can be brought about by water removal from the gel, for example by the use of concentrated salt solutions (such as sodium chloride) which remove water by osmosis, or by the use of a solution which changes the pH of the collagen gel such that water is lost from the gel. Thus, one embodiment of the present invention, envisages the use of an acidic gel and an alkaline coagulation agent which neutralises the acid and leads to water loss in the gel (for example, a solution of sodium hydroxide, sodium carbonate, ammonium sulphate, sodium bicarbonate, or ammonium hydroxide; or even by means of gaseous ammonia). For example, an aqueous alkali solution of sodium carbonate of pH9 to 13 may be used.

Alternatively or additionally, coagulation may be brought about by means of chemical modification of the collagen, such as by cross-linking. Suitable chemical modification systems include the use of glutaraldehyde, glyoxal, liquid smoke, sugars and mineral tanning agents. Liquid smoke is a well known material in the art and is for example described in patent GB1432271. Modification of the collagen casing may be brought about by proteolysis, caramel addition, or by the use of modified polysaccharides, for example propylene glycol alginate or hydroxy propyl methyl cellulose. Cellulose fiber may also be added for certain cooking properties.

Certain chemical modifying agents are suitable for inclusion in the gel prior to extrusion, particularly cross-linking agents such as glutaraldehyde, and liquid smoke. Vegetable oil may be included in the gel to control coagulation and surface characteristics (such as clarity and permeability). According to a preferred embodiment of the invention, a coagulating agent which is a cross-linking agent (such as glutaraldehyde, glyoxal, liquid smoke, sugars and mineral tanning agents) is included in the collagen gel prior to extrusion, and the co-extruded collagen casing in then subject to coagulation by water loss in the post extrusion bath. This enables a coagulated collagen casing of sufficient strength to be produced, which may be twist-linked, crimped or otherwise mechanically separated into sausage links without breakage or disintegration.

The preferred chemical coagulating bath has a pH in the range 8 to 12, and preferably 9 to 10; and a temperature of 5° to 45° C., preferably 35° to 40° C.

The process is much less costly than the standard processes because it omits the expensive and time consuming mechanical drying. Air drying is the most usual form of drying employed in conventional co-extrusion processes and it is the main feature which limits the speed of the process. Thus, the present invention not only produces a product which can be directly handled and/or hung but one which is much cheaper to operate than known co-extrusion processes.

Preferably, the collagen gel is an acidic gel at a pH of 1 to 4. Usually, the gel comprises 90 to 95% water. The collagen gel may be cooled to a temperature of 4° to 16° C. prior to extrusion.

A preferred collagen gel comprises 4 to 10% collagen, 0.1 to 2% cellulose, 0.05% to 0.5% hydrochloric acid, preferably 0.3%, the balance being water.

Colouring agents may be included in the casing, for example by incorporating a colouring agent in the gel itself, or within a crosslinking agent (such as liquid smoke) injected into the gel prior to extrusion. Alternatively, the colouring agent may be injected independently into the gel prior to extrusion thereof.

The co-extruded edible product may also be coloured if desired, depending on the desired appearance characteristics.

Suitable colouring agents are well known in the art and include, for example, annato, sunset yellow, curcumin, cochineal, tartrazine yellow etc.

Usually, the amount of collagen gel co-extruded around the edible product is 3 to 10% of the total weight of gel and edible product. Preferably, the finished coagulated collagen gel casing has a thickness of 10 to 30 microns. The thickness is generally in proportion to the diameter of the sausage.

Usually, a coagulation time of 5 to 300 seconds is employed in order to allow coagulation to be substantially completed. This is preferably achieved by passing the co-extruded product from the coagulation baths into a holding chamber, such as a spiral trough or flume downstream with the coagulating bath to allow substantial completion of coagulation. Further coagulating solution or other treatment solutions may be passed concurrently down the flume or showered thereinto. The co-extruded product is then preferably washed prior to separation into linking.

In a modification of the process, after the chemical coagulating bath, the product was subjected to chemical dehydration employing a chemical dehydrating agent, such as sodium carboxymethyl cellulose, 0.1 to 2% solution and preferably 1% solution.

The process according to the present invention allows the continuous non-batch production of linked sausages, which has not been possible hitherto. Thus, conventional link sausages are produced in batch mode using discrete lengths of preformed natural or reconstituted collagen casings placed on a stuffing horn. The conventional arrangement does not allow the production of continuous lengths of linked sausage. Thus, the present invention is well suited to industrial production and packaging techniques.

An embodiment of the invention will now be described by way of example only in conjunction with FIG. 1 which is a schematic flow chart of a process and apparatus according to the invention.

A sausage meat paste mix is delivered from a vacuum filler 2 (e.g. a Handtmann FA30 or PA30) by a meat metering pump 4 to a co-extruder 6. An acid collagen gel is delivered from a gel storage vessel 8 by means of a gel metering pump 10. The gel storage vessel is usually pressurised to assist delivery of the gel, which has been prepared from hide splits, homogenised and filtered according to known technology.

Liquid smoke (or other cross-linking agent) from a container 12 is metered by a metering pump 14 into the collagen gel prior to co-extrusion.

The co-extruder may be of a design known in the art such as a conical extruder or a contra-rotating disc extruder such as disclosed in U.S. Pat. No. 3122788. The co-extruder extrudes a core of sausage meat through a central round die, and extrudes simultaneously a coating of collagen gel onto the meat core via an annular die surrounding the central round die.

The co-extruded coated sausage meat passes into a coagulation treatment bath 16 which comprises a shallow stainless steel trough having therein a conveyor formed of wire links to enable coagulation solution to freely contact the co-extruded collagen coating. Typically the trough is 2 to 10 m long in order to provide the desired residence time. Part of the coagulation solution is bled off and replaced by fresh solution from a feed stock tank 18 supplied from a make-up tank 20 in order to maintain correct concentrations in the solution.

In order to allow coagulation to be completed the co-extruded sausage is then passed into a spiral solution trough 22. The trough 22 is a spiral or a helical flume (length 10 to 50 m) in order to provide the desired residence time in a compact arrangement. Usually the co-extruded sausage is fed into an upper end and passes down by gravity. A haul-off (not shown) may be provided at the downstream end. As required, further coagulating solution and/or washing solution may be passed down the flume (or showered onto the sausage) in order to complete the treatment.

At this stage the coagulated collagen sausage casing has a strength which is substantially its finished strength and is adequate to allow conventional twist-linking or crimping in linker 24. The collagen casing is strong enough to be twisted or crimped. Equally, the co-extruded sausage may be cut into individual sausages at this point if desired. The sausage meat paste inside is, however, still fluid enough to be displaced during the twisting or crimping operation (in contrast to the conventional process where full strength in the casing is only achieved after air drying and partial cooking and solidification of the sausage meat paste).

The twist-linked or crimped sausage string may then be hung and smoked in cabinet 26 according to conventional practice.

EXAMPLES

The following Examples illustrate the invention and were carried out by extrusion of a central core of sausage meat mixture typically of pH5 at about 4° C., and co-extrusion of a collagen gel through an annular die around the central core. The collagen gel was typically an acid gel of pH2 to 3 at a temperature of about 6° C. The co-extruded product was usually led into a sodium carbonate coagulation bath which typically increased the pH of the collagen gel casing to around pH10 to 11 thereby dewatering the gel. The tensile strengths were measured after substantial completion of coagulation of the collagen casing. Any liquid smoke was metered into the gel upstream of the co-extruder head.

EXAMPLE 1 (Varying Coagulation Time)

The experimental conditions were as follows:
extrusion speed=9.75 m/minute
gel type=4.7% collagen, 5.8% solids gel quantity=170 g/minute
extrusion calibre=16 mm
coagulation solution=16.7% w/w aqueous sodium carbonate at 18° C.

The results are given in Table 1. Tensile strengths of at least 1.0 kg would generally be required to produce an acceptable product. The bursting calibre is obtained by squeezing the sausage meat up and so expanding the casing until it bursts.

TABLE 1

| Contact Time with Coagulation Solution | Bursting calibre (mm) | Tensile Strength (kg) (Extrusion Direction) |
|---|---|---|
| 16 sec | 20–22 | 0.323 |
| 26 sec | 20–21 | 0.273 |
| 46 sec | 21 | 0.312 |

EXAMPLE 2 (sodium carbonate and glutaraldehyde coagulating agents)

The experimental conditions were as follows:
extrusion speed=9.14 m/minute
gel type=4.7% collagen, 5.8% solids
gel flow rate=200 g/minute
extrusion calibre=18–19 mm
The results are given in Table 2.

TABLE 2

| Solution Type | Contact Time of Solution (sec) | Tensile Strength (kg) (extrusion direction) |
|---|---|---|
| 22% w/w $Na_2CO_3$ at 35° C. | 16 | 0.616 |
| | 26 | 0.681 |
| | 36 | 0.887 |
| 22% w/w $Na_2CO_3$ + 500 ppm Glutaraldehyde at 35° C. | 16 | 0.888 |
| | 26 | 1.130 |
| | 36 | 1.215 |

EXAMPLE 3 (liquid smoke in collagen gel)

The experimental conditions were as follows:
extrustion speed=9.14 m/min
gel type=4.7% collagen, 5.3% solids
extrusion calibre=26 mm
coagulation solution=21% w/w sodium carbonate @ 33°–44° C.
contact time with solution=40 seconds.

Liquid smoke was injected directly into the gel stream upstream of the co-extruder.
The results are given in Table 3.

TABLE 3

| Smoke type | Smoke level (% of gel volume) | Bursting calibre mm | Tensile Strength kg (Extrusion direction) |
|---|---|---|---|
| Zesti 10DC | 10 | 29–31 | 1.15 |
| Imperial 400N | 10 | 30–31 | 1.08 |
| Zesti 10DC | 5 | 29–30 | 1.07 |
| Imperial 400N | 5 | 29–30 | 1.05 |
| Imperial 1000P | 5 | 28–30 | 1.08 |

EXAMPLE 4 (varying gel)

The experimental conditions were as follows:
extrusion speed=9.14 m/min
gel type=6.0% collagen 6.4% solids
extrusion calibre=19 mm
coagulation solution=21% w/w sodium carbonate
Direct injection of Zesti 10 liquid smoke into gel stream.
Contact time with solution=40 seconds
The results are given in Table 4.

TABLE 4

| Gel usage g/min | Extruder direction Tensile Strength (kg) |
|---|---|
| 120 | 1.08 |
| 148 | 1.28 |
| 170 | 1.44 |
| 190 | 1.64 |

EXAMPLE 5 (varying extruder disc speed)

The experimental conditions were as follows:
extrusion speed=15.24 m/min
gel type=6% collagen 5.4% solids
extrusion calibre=19 mm
coagulation solution=21% w/w sodium carbonate at 40° C.

Direct injection of Zesti 10 liquid smoke into gel stream at 5% w/w on gel flow rate of 200 g/min.
The results are given in Table 5.

TABLE 5

| Disc speed of extruder | Bursting calibre (mm) | Extruder Direction tensile strenth (kg) |
|---|---|---|
| 60 rpm | 25–26 mm | 1.808 kg |
| 96 rpm | 26–27 mm | 1.959 kg |
| 124 rpm | 26–27 mm | 2.035 kg |
| 184 rpm | 26 mm | 1.690 kg |
| 240 rpm | 25–26 mm | 1.26 kg |

EXAMPLE 6 (varying extruder disc speed)

The experimental conditions were as follows:
extrusion speed=41.15 m/min
gel type=4.7% collagen 5.8% solids
extrusion calibre=19 mm
coagulation solution=21 w/w sodium carbonate at 40° C.
gel flow rate=522 g/min.
Direct injection of Zesti 10 liquid smoke into gel stream at 5% w/w.
The results were as follows:

(a) Extruder disc speed at 265 rpm – tensile = 1.866 kg (± 0.254 kg)
   bursting calibre = 24 mm
(b) Extruder disc speed at 302 rpm – tensile = 2.152 kg (± 0.131)
   bursting calibre = 24mm.

EXAMPLE 7 (mixed coagulation agents)

The experimental conditions were as follows:
extrustion speed=15.2 m/min
gel flow rate=199 g/min
gel type=4.7% collagen 5.6% solids
5% by volume at Zesti 10 liquid smoke addition to gel stream.

coagulation time=40 seconds coagulation temperature=40° C.

The results were as follows:

(a) Coagulation solution composition=21% w/w aqueous sodium carbonate. Extrusion direction tensile strength= 2.212 kg (±0.214 kg)

(b) Coagulation solution composition=18% NaCl and 9.6% $Na_2CO_3$ by weight. Extrusion direction tensile strength=2.055 kg (±0.268 kg).

We claim:

1. A process of producing a linked co-extruded edible product comprising the steps of:

forming a collagen gel, the collagen gel comprising collagen and a strong inorganic acid;

co-extruding a substantially uniform coating of said collagen gel around a length of an extruded edible fluid product;

feeding the co-extruded collagen gel and edible product along a path while contacting the coating of collagen gel with a chemical coagulation bath comprising an aqueous solution of sodium carbonate, said bath having a chemical coagulating agent;

applying a cross-linking agent to said gel;

coagulating said coating of collagen gel for a predetermined coagulation time, while maintaining said edible fluid product in a fluid state, to form a collagen casing which is sufficiently strong to allow mechanical twist-linking of said casing and edible fluid product at spaced points along said length; then mechanically linking said casing and edible fluid product at said spaced points while said co-extruded edible fluid product is still in said fluid state; and displacing said edible fluid product away from said spaced points during said linking.

2. The process according to claim 1, wherein the collagen gel has a pH of between 1 and 3 and includes HCL as a strong inorganic acid;

a cross linking agent of liquid smoke or glutaraldehyde is applied to said collagen gel;

the collagen coating is contacted with a coagulation bath of an aqueous solution of sodium carbonate at a temperature of between about 33° and 44° C.; and the step of coagulating said coating of collagen gel is effected in the absence of mechanical drying and by maintaining said coating of collagen gel in contact with said bath for said predetermined coagulation time until said collagen casing has a tensile strength of at least 1 kg.

3. The process according to claim 2, wherein the collagen gel is at a temperature of 4° to 16° C. prior to extrusion.

4. The process according to claim 3, wherein said cross-linking agent is incorporated into the collagen gel prior to extrusion.

5. The process according to claim 4, wherein said cross-linking agent is liquid smoke.

6. The process according to claim 2, wherein said cross-linking agent is glutaraldehyde and is incorporated into said coagulation bath.

7. The process according to claim 2 wherein the coagulation time is in the region 5 to 300 seconds.

8. The process according to claim 7 wherein the amount of collagen gel co-extruded around the edible product is 3 to 10% of the total weight of the co-extruded edible product.

9. The process of claim 1, wherein the co-extruded collagen gel and edible product is fed downwardly along a helical path while said coating of collagen gel is contacted with said bath.

10. The process of claim 9, wherein said bath is showered onto said co-extruded collagen gel and edible product as they are fed in said helical path.

11. A process of producing links of edible product comprising the steps of:

co-extruding a substantially uniform coating of collagen gel, comprising collagen and a strong inorganic acid, around an extruded edible product to form a co-extruded coated edible product;

feeding the co-extruded coated edible product downwardly in a helical path;

applying a coagulating bath containing a chemical coagulating agent comprising an aqueous solution of sodium carbonate to the coated edible product as it is fed in said helical path to coagulate said coating;

applying a cross-linking agent to said gel; and then mechanically linking said coated edible product into links.

12. The process of claim 11, wherein the coagulating bath containing the chemical coagulating agent is showered onto the coated edible product as it is fed in said helical path.

* * * * *

UNITED STATES PATENT AND TRADEMARK OFFICE
CERTIFICATE OF CORRECTION

| | | |
|---|---|---|
| PATENT NO. | : | 5,795,605 |
| DATED | : | August 18, 1998 |
| INVENTOR(S) | : | MORGAN et al. |

It is certified that error appears in the above-identified patent and that said Letters Patent is hereby corrected as shown below:

On the title page, and column 1 lines 1 and 2, change

"PROCESS FOR PRODUCING A LINKED, CO-EXTRUDED EDIBLE PRODUCT" to

-- PROCESS OF PRODUCING A LINKED, CO-EXTRUDED EDIBLE PRODUCT --.

Signed and Sealed this

Nineteenth Day of January, 1999

Attest:

*Attesting Officer*

*Acting Commissioner of Patents and Trademarks*